Nov. 30, 1937.  H. A. STILSON  2,100,926
ANIMAL TRAP
Filed Nov. 14, 1934
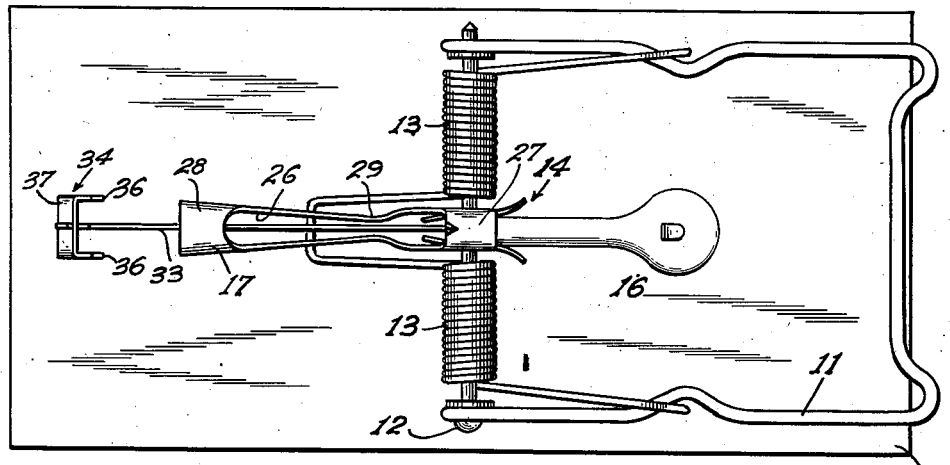
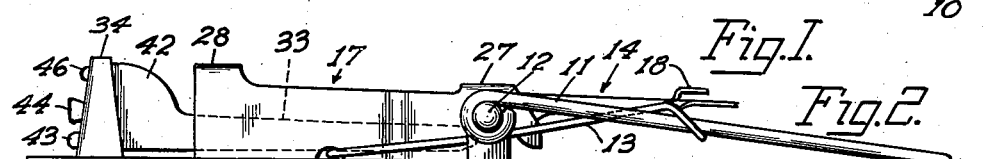
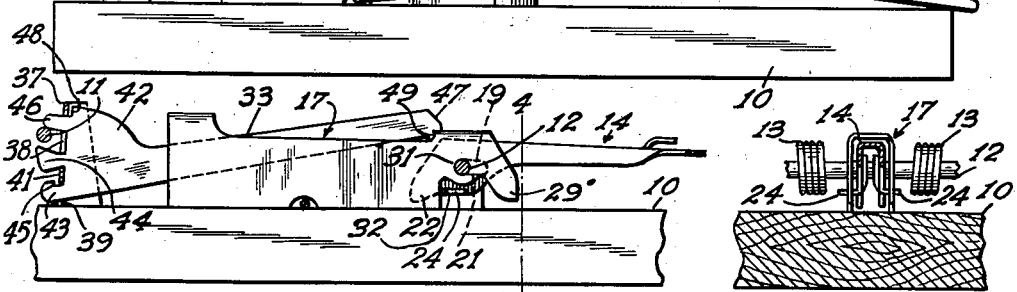
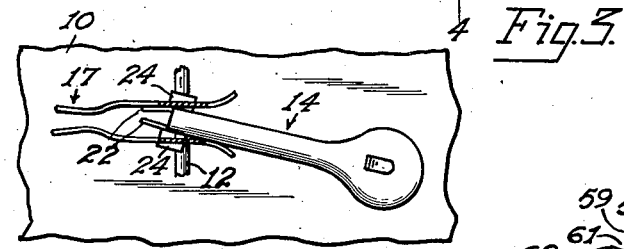
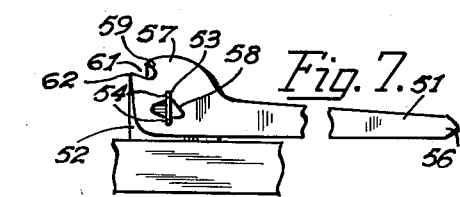
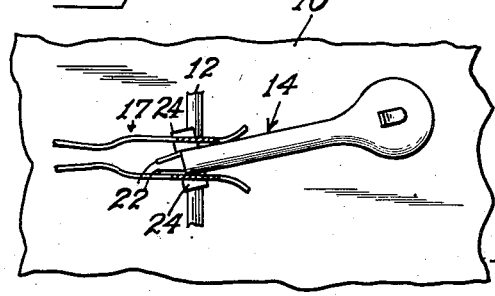
Inventor:
Herbert A. Stilson.
By George E. Mueller
Atty.

Patented Nov. 30, 1937

2,100,926

UNITED STATES PATENT OFFICE 2,100,926

ANIMAL TRAP

Herbert A. Stilson, Chicago, Ill.

Application November 14, 1934, Serial No. 753,000

20 Claims. (Cl. 43—83)

My invention relates in general to animal traps and in particular to a mouse and rat trap in which the usual spring actuated jaw may be released upon movement of the releasing means in any one of three directions.

In the traps usually employed for catching mice and rats, the release means ordinarily operates in only one direction, namely, downwardly. It has been found that the animal has been able to remove the bait in the present construction without releasing the trap to kill the animal. Attempts have been made to produce traps which would release upon movement in more than one direction, but these traps have all been so complicated as to cause some difficulty, and certainly irregularity, in releasing the trap, and in addition are so expensive a structure as to be impractical. Even with a feature permitting the release of the trap in more than one direction it is still necessary, in order to be practical from a sales standpoint, that the trap be sold at the very low price prevalent for devices of this nature on the market at the present time.

It is an object of my invention to provide an improved animal trap.

A further object is to provide a three-way release mechanism for the trap.

A still further object is to provide a sturdy, inexpensive trap having stamped metal parts which may be quickly assembled.

It is also an object to provide an animal trap which is as sensitive to release in any one of three directions as is possible with a one-way release.

Other objects and advantages will be apparent from the following description taken with the drawing, in which:

Fig. 1 is a top plan view of the complete trap in inoperative position.

Fig. 2 is a side elevation of the trap of Fig. 1.

Fig. 3 is a fragmentary view partly in section showing a portion of the trap mechanism with the trap in operative position.

Fig. 4 is a fragmentary sectional view along the line 4—4 of Fig. 3.

Fig. 5 is a fragmentary top plan view of a portion of the bait holding and trap release treadle in one sideward release position.

Fig. 6 is a corresponding top plan view of the mechanism of Fig. 5 in a second sideward release position.

Fig. 7 is a modification of the jaw holder and jaw holder support.

In practicing my invention I provide an animal trap including a base with a spring actuated jaw pivotally supported thereon, jaw locking mechanism and a three-way jaw releasing and bait holding treadle.

As discussed above, it has been found that mice, and rats particularly, are able to remove the bait from a trap which releases only by downward pressure, without springing the trap. In many instances the animal approaches the treadle from one side or the other without exerting any downward pressure. With the structure illustrated and described herein, however, I overcome this difficulty by providing a bait holding treadle and jaw release means which may be moved in any one of three directions to release the jaw. It will release upon movement to either side or downwardly in the usual direction. This result is accomplished in a trap with a base 10, the usual jaw 11 pivoted on a pin 12 supported on the base, and actuated by a pair of spring coils 13 supported on said pin.

The bait holding and jaw release mechanism includes a bi-part treadle 14 including a bait holding portion 16 and a support and release 17. As shown particularly in Figs. 2, 3, 5 and 6, the bait holding portion 16 comprises a flat plate-like portion at the front with a prong 18 for carrying the bait and extending rearwardly to an enlarged head 19 having downwardly extending side walls with elongated pivot apertures 21 to fit over the pin 12. The head has a pair of extensions 22 acting as stops at the lower rear edge to limit the upward pivotal movement of the portion 16. The extensions 22 are bowed slightly to operate for sideward release of the treadle as will be hereinafter explained. An ear 24 extends outwardly from each of the side walls of the head 19 below the pivot apertures 21. The portion 17 is provided in an elongated channelled shape with a slot 26 along the top thereof, a holder seat 27 connecting the walls at the front end, and a connecting bridge 28 at the rear end. The walls extend through a constricted portion 29 intermediate the ends, to serve as guide means as will be hereinafter explained. The walls at the front end of the member 17 are irregularly shaped to provide by their design stops 29' to limit the pivotal movement of the member, pivot apertures 31, and a cut-away portion with shoulders 32 for engagement with the ears 24 on the treadle part 16.

The jaw 11 is locked in operating position by a jaw holder 33 pivotally supported at the rear of the trap by a pivot support 34. The pivot support 34 comprises a generally U-shaped body portion with integral prongs adapted to be driven into the wood to secure the pivot support thereto. The body portion tapers upwardly as shown in Fig. 3 with integral side walls 36, an open front, and a rear wall 37. The latter is provided with an elongated slot 38 at the top of the member and a comparatively short slot 39 adjacent the base with an intervening strap 41 acting directly to pivotally support the holder 33. The holder 33 in turn comprises an elongated shank extending to an enlarged head 42, notched at the rear end to provide pivot extensions 43 and 44 fitting on each side of the strap 41 and spaced apart the width of the strap, and a rounded shoulder 46 at the top of the head 42 for engaging the jaw 11 as shown in Fig. 3. The pivot extension 44 and the shoulder 46 are spaced apart slightly more than the diameter of the wire of the jaw 11. A protrusion 45 on the extension 43 prevents the removal of the holder from the support 34.

In the assembly of my trap I mount the bi-part treadle 14, spring coils 13, and jaw 11, on the pin 12 in a single operation. The holder 33 is assembled on its pivot support 34 with the extensions 43 and 44 on each side of the strap 41. The holder is inserted under the bridge 28 of the treadle, and the pivot support 34 then stamped or pressed into the base and suitably secured thereto. The holder and treadle are then lying in the position shown in Figs. 1 and 2 preparatory to setting the trap.

The trap is self-setting and is set by pivoting the jaw rearwardly to pass over the top of the tapered pivot support 34. The jaw passes the shoulder 46 and engages the extension 44 to pivot the holder 33 upwardly, whereby the pointed tip 47 engages the under surface of the seat 27 on the support 17 and pivots said treadle. As the jaw is then pushed downwardly, the holder raises still higher and raises the treadle until the pointed tip 47 slides past the edge of the seat 27. The shoulder stop 48 on the holder engages the inside surface of the pivot support 34 and limits the upward movement of said holder. The holder 33 then drops to rest on the seat 27 at the under edge 49 of the point of said holder. The edge 49 is curved to conform to the arc of a circle drawn with the pivot pin as the center so as to cause the holder to release without being raised by the treadle. In this position the jaw 11 engages under the shoulder 46 and is releasably locked in operating position. Inasmuch as the side walls of the pivot support 34 do not act in any way to guide the holder 33 in its pivotal movement, the walls of the support 17 are constricted at a portion 29 as previously explained, to act as guide walls for the holder and hold it within a comparatively narrow plane corresponding to the distance between the ends of the extensions 22 of the member 16. This holds the holder in line and provides free pivotal movement thereof.

After the trap is set in the manner described, the jaw 11 may be released by moving the treadle and particularly the bait holding portion 16 in any one of three directions. First, to operate in the conventional downward direction, the bait holding portion 16 is pressed downwardly to cause the ears 24 to each simultaneously engage the shoulders 32 of the support 17 and raise said support as though the bi-part treadle were a single member. The bait holding portion may be pushed down a distance limited by the stops 29' on the support 17, during which time the pointed end of the holder 33 is unseated to release the jaw 11 from the shoulder 46 of the holder. On the other hand, when the trap is in operative position if the animal nibbling at the bait pushes the bait holding portion 16 to the left as shown in Fig. 5, the ear 24 on the left side of the member engages the corresponding shoulder 32 of the support 17 and pushes forwardly against said shoulder. Inasmuch as the support 17 is pivoted to the stationary pivot pin 12, this forward pressure as the portion 16 is pushed sideward raises the support 17 to unseat the holder in the manner previously described. The same operation is performed when pushing the bait holding portion 16 to the right as shown in Fig. 6 and the ear 24 on that side engages the corresponding shoulder 32 of the support 17 of the bi-part treadle. The two portions of the treadle are of a dimension at their pivot points to provide the same play between them, as shown in Figs. 5 and 6, and with the extensions 22 bowed inwardly slightly, and the front ends of the support 17 bowed outwardly the sideward movement is easily accomplished with very slight pressure.

Although stops 22 are provided at the rear of the bait holding portion 16 to limit pivotal movement upon raising the bait holding plate of this portion, it is seldom during the operation of the trap that such stopping means is necessary. With the center of gravity of the portion 16 considerably to the front of the pivot pin 12, said portion 16 lies back with the ears 24 in continuous engagement with the shoulders 32 of the support 17 of the treadle. The treadle operates in effect as a single integral member at all times except when the bait holding portion is pushed either to the right or to the left, at which time the portion 16 utilizes the elongated slots 21, permitting this movement and at the same time serving as a pivot aperture upon pivotal movement of the entire treadle.

To insure the maximum sensitivity for the release of the trap, it is desired to have the holder press against the seat 27 with as little pressure as possible, thus reducing the friction between these two members to a minimum. This is accomplished in the pivot support 34 by tapering the side walls as previously described. This inclines the front wall of the support, and although it is of course a straight line wall, it corresponds in general to an arc of a circle described upon the pivotal movement of the jaw 11. Thus the pivot support may be secured to the base at a further distance from the seat 27 than would be possible with a vertical wall support, and reduce the leverage on the holder in set position. This of course reduces the friction between the seat 27 and the edge 49 of the holder, and causes the treadle to move upon very slight pressure.

A modification of the holder and holder support is illustrated in Fig. 7 with the holder designated by reference character 51 and the support by 52. The structure is similar to that shown in my copending application, Serial No. 739,541, in which the support 52 comprises a vertical body portion extending longitudinally of the base 10. An ear 53 is stamped out of the body portion and extends at right angles thereto with notches 54 at the top and bottom adjacent the body to pivotally support the holder 51. As to the holder, this comprises an elongated shank with a tip 56 similar to the tip 47 extending to an enlarged head 57 having a substantially diamond-shaped aperture 58. The aperture is long enough to fit over the ear 53 to assemble the holder thereon when said holder is held practically vertically, and wide enough to somewhat loosely span the connecting portion from the lower notch 54 to the upper, and pivot upon this connecting portion.

The lower rear edge of the head is curved sufficiently to clear the base 10 in the pivotal movement of the holder. The top of the head curves over a stub shoulder 59 to a notch 61 for receiving the jaw 11. A lip 62 protrudes from the lower edge of the notch. As the jaw is pivoted to set position, it engages the lip 62 and raises the holder as previously described, to in turn pivot the treadle. The holder then falls upon the treadle seat and the jaw 11 is positioned in the notch 61, and held therein under spring tension by the tip of the shoulder 59. This type of holder and holder support not only has many advantages from a manufacturing standpoint, but makes it possible to move the fulcrum of the holder as far as possible from the holder seat within the limits of the dimensions of the jaw, thus reducing the leverage at the pointed end of the holder and in turn reducing the friction between the seat and lever so as to release the trap upon the slightest pressure upon the treadle. The structure of Fig. 7 also provides very sturdy members which may be stamped out at very low cost, both as to material and labor, and furthermore, may be very quickly assembled.

Although I have described my trap as releasable in three directions, it will also be apparent that release of the jaw is effected upon movement of the treadle in a fourth direction. With the bait holding portion 16 pivoted at the elongated apertures 21 (Fig. 3), and the ears 24 bearing against the shoulders 32 on the portion 17 of the treadle, the latter will pivot upwardly upon rearward pressure against the portion 16 in a horizontal plane. The elongated apertures 21 permit rearward movement of the bait holding portion of the treadle, and as stated, rearward movement of this portion pivots the portion 17 and causes the release of the holder to in turn release the jaw.

As is readily apparent, the parts of the entire trap may be stamped from a small amount of material and are so simple in design as to require only very inexpensive dies. The construction further permits ready assembly of the various parts and reduces the labor cost to a minimum to provide in all, a trap practically the same in cost as the conventional one-way operable trap, with the advantage of a three-way operation.

Although I have described my invention in its preferred embodiments, it is understood that I am not limited thereby, but limit the invention only by the scope of the appended claims.

I claim:

1. An animal trap including a base, a spring actuated jaw, means for releasably holding said jaw, said means including a three-way movable articulated bi-part treadle carried on said base.

2. An animal trap including a base, a spring actuated jaw, a movable holder cooperating to lock said jaw in operative position, and jaw release means including a three-way movable articulated bi-part treadle carried on said base.

3. An animal trap including a base, a spring actuated jaw, means set by operating the jaw against the spring to its operative position for releasably holding said jaw, and jaw release means including a treadle adapted for movement to each side of a straight line normal position, and downwardly to release the jaw.

4. An animal trap including a base, a spring actuated jaw, a jaw holder pivotally supported at one end of the base, and an articulated bi-part pivotal treadle cooperating with said holder to releasably lock said jaw in operative position, one part of said treadle being operable in a plurality of directions to cause the other part to operate to release the holder.

5. An animal trap incuding a base, a spring actuated jaw, a jaw holder, a pivot support extending upwardly at the rear of the trap to carry the holder, and an articulated bi-part pivotal treadle cooperating with said holder to releasably lock said jaw in operative position, one part of said treadle being operable in a plurality of directions to cause the other part to operate in a single way.

6. An animal trap including a base, a spring actuated jaw, a pivot pin supported on the base for pivotally carrying said jaw, and means for releasably holding said jaw, said means including an articulated bi-part treadle with each part pivotally supported on the pivot pin and positioned to provide an elongated member extending forwardly and rearwardly from the pivot pin, one part of said treadle being operable in a plurality of directions to cause the other part to operate in a single way.

7. An animal trap including a base, a spring actuated jaw, a pivot pin supported on said base for pivotally carrying said jaw, and means for releasably holding said jaw, said means including a bi-part treadle with the two parts supported on the pivot pin in horizontal alignment with the adjacent ends of the treadle overlapping, and means on said adjacent ends cooperating to pivotally move said treadle as a single unit upon actuation thereof.

8. An animal trap including a base, a spring actuated jaw, a pivotal holder cooperating to releasably lock said jaw in operative position, said holder including an elongated shank and an enlarged head notched at one end thereof to provide extensions thereon, and a pivot support for said holder including a body portion for fastening to the base having an inclined wall slotted to receive the extensions on the holder and pivotally support said holder.

9. An animal trap including a base, a pivoted jaw, means for automatically setting the jaw in operative position, said means including a treadle, a holder and a pivot support for said holder comprising a vertical plate extending longitudinally of the trap base, and an outwardly extending ear on the support inserted in an aperture in the holder to carry said holder, and means responsive to movement of the treadle in any one of three directions for releasing the jaw.

10. An animal trap including a base, a spring actuated jaw pivoted thereon, a pivoted holder, and an articulated bi-part treadle including a bait holding portion, and a holder engaging portion and means for releasing the holder from one portion of the treadle upon forward movement in a horizontal plane or downward movement of the bait holding portion of the treadle.

11. An animal trap including a base, a spring actuated jaw, a pivot pin supported on said base for pivotally carrying said jaw, and means for releasably holding said jaw, said means including a bi-part treadle with the two parts supported on the pivot pin, a first part releasing the jaw upon pivoting about a horizontal axis, and the other part operable in three directions to cause said first part to so pivot as to release said jaw.

12. An animal trap including a base, a spring actuated jaw, a pivot pin supported on said base for pivotally carrying said jaw, and means for releasably holding said jaw, said means including a bi-part treadle with the two parts supported on the pivot pin, a first part operating to release the jaw upon vertical movement and having shoulders vertically spaced from the pin, and the second part having shoulders engaging the first named shoulders and spaced fulcrum points engaging the pin whereby operation of the second part with vertical movement about the pin or with lateral movement about a fulcrum point will cause a vertical movement of the first part.

13. An animal trap including a base, a spring actuated jaw, a jaw holder which when said jaw is in set position, extends from the end of said jaw approximately to its pivotal axis, a pivot support for said holder including a channelled body portion within said jaw when said jaw is in set position and adjacent its end adapted to be secured to the base with two side walls having their bottoms engaging the base and means for releasing said jaw when in set position.

14. An animal trap including a base, a pivoted spring actuated jaw, jaw holding means positioned to engage the end of said jaw and extending toward its pivotal axis, a pivot support for said means including a channeled body portion secured to the base with its three walls uprising therefrom, the intermediate wall thereof engaging said holding means and forming a pivot therefor, and the side walls engaging the base and bracing said center wall.

15. An animal trap including a base, a pivoted spring actuated jaw, jaw holding means positioned to engage the end of said jaw and extending toward its pivotal axis, a pivot support for said means including a U-shaped body portion secured to the base having oppositely disposed side walls and an intermediate upright connecting wall as a center portion with its side walls resting on the base and bracing its center portion and with its center portion notched intermediate said base and the top edge of the pivot support to form a pivot for said holding means.

16. An animal trap including a base, a pivoted spring actuated jaw, jaw holding means positioned to engage the end of said jaw and extending toward its pivotal axis, a pivot support for said means including a U-shaped body portion secured to the base having oppositely disposed side walls and an intermediate upright connecting wall as a center portion with its side walls resting on the base and bracing its center portion and with its center portion notched intermediate said base and the top edge of the pivot support to form a pivot for said holding means, said holding means including a flat plate notched at its ends to engage the pivot support and extending through said pivot support to engage the jaw to be pivoted thereby.

17. An animal trap including a base, a pivoted spring actuated jaw, jaw holding means positioned to engage the end of said jaw in set position and extending toward its pivotal axis, a pivot support for said means, including a U-shaped body portion secured to the base with its side walls resting on the base and bracing its center portion and with its center portion notched to form a pivot for said holding means, said holding means including a flat plate notched at its ends to engage the pivot support and extending through said pivot support to engage the jaw to be pivoted thereby, said pivot support and said plate having interengaging shoulders formed thereon for limiting the pivotal movement of the plate.

18. An animal trap including a base, a pivoted spring actuated jaw in set position, jaw holding means including a flat plate positioned to engage the jaw at its end and extending toward the pivotal axis of the jaw, a pivot support for said holding means comprising a body secured to said base and having a substantially flat upstanding wall braced at its sides and being slotted to form upper and lower webs; said flat plate being notched at its end to form fingers extending through said upstanding wall and a shoulder positioned to engage the upper of said connecting webs, the lower of said fingers being hook shaped to engage the lower of said connecting webs and to operate in co-action with said shoulder to limit the pivotal movement of said holding means.

19. An animal trap including a base, a spring actuated jaw, a jaw holder approximately as long as the length of the jaw from its pivotal axis to its outer extremity, a pivot support for said holder secured on said base, including a channelled body portion with tapered side walls and a pivot wall connecting the side walls and inclined to an angle corresponding to the taper of the side walls, and means cooperating with said holder to releasably hold said jaw in operative position.

20. An animal trap including a base, a spring actuated jaw, a jaw holder approximately as long as the length of the jaw from its pivotal axis to its outer extremity, a one-piece pivot support for said holder driven into said base to be secured thereon including a pair of side walls wider at the bottom thereof than at the top, and an integral pivot wall connecting said side walls and including a connecting bar therein cooperating to retain the jaw holder thereon, and means cooperating with said holder to releasably hold said jaw in operative position.

HERBERT A. STILSON.

DISCLAIMER 2,100,926.—*Herbert A. Stilson*, Chicago, Ill. ANIMAL TRAP. Patent dated November 30, 1937. Disclaimer filed July 18, 1940, by the inventor; the exclusive licensee, *McGill Metal Products Company*, consenting.

Hereby enters this disclaimer to claims 1, 2, 4, 5, 6, 7, and 11.

[*Official Gazette August 6, 1940.*]